[29.]

THOMAS W. JOHNSON, Jr. & A. W. GOODELL.

Apparatus for Evaporating and Concentrating Bark Extracts.

No. 4,531. Reissued Aug. 29, 1871.

Witnesses.

Chas N Smith

Harold Serrell

Thos W Johnson Jr.

A. W. Goodell

Lemuel W. Serrell atty

UNITED STATES PATENT OFFICE.

THOMAS W. JOHNSON, JR., AND ANTHONY W. GOODELL, OF WINDSOR, NOVA SCOTIA.

IMPROVEMENT IN APPARATUS FOR EVAPORATING AND CONCENTRATING BARK EXTRACTS.

Specification forming part of Letters Patent No. 108,793, dated November 1, 1870; reissue No. 4,531, dated August 29, 1871.

*To all whom it may concern:*

Be it known that we, THOMAS W. JOHNSON Jr., and ANTHONY W. GOODELL, formerly of the city and State of New York, now of Windsor, Nova Scotia, have invented and made a new and useful Improvement in Evaporating Apparatus for Concentrating Bark Extracts, &c.; and the following is declared to be a correct description thereof.

The watery portion of various extracts has heretofore been evaporated for concentration by means of disks of metal upon a shaft set to revolve, so that the disks are partially immersed, and the portions of said disks that are exposed to atmospheric influences increase the rapidity with which the concentration is effected, in consequence of the thin film that there is of the liquid upon said disks. These metal disks, however, are liable to become partially or entirely dry near the center portions, particularly as the liquid lessens by evaporation; and with some extracts, such as those of oak or hemlock-bark, the atmosphere produces an acidity that is detrimental.

Our invention relates to a method of concentrating extracts my means of disks that revolve in a casing through which a current of heated air is directed. The disks, which are preferably of wood, are more effective than metal, on account of slightly absorbing the liquid and remaining constantly wet, and the casing in which the disks revolve is adapted to heating both the material and the air in the most economical manner, at the same time avoiding a temperature that would injure the material by boiling.

Figure 1:
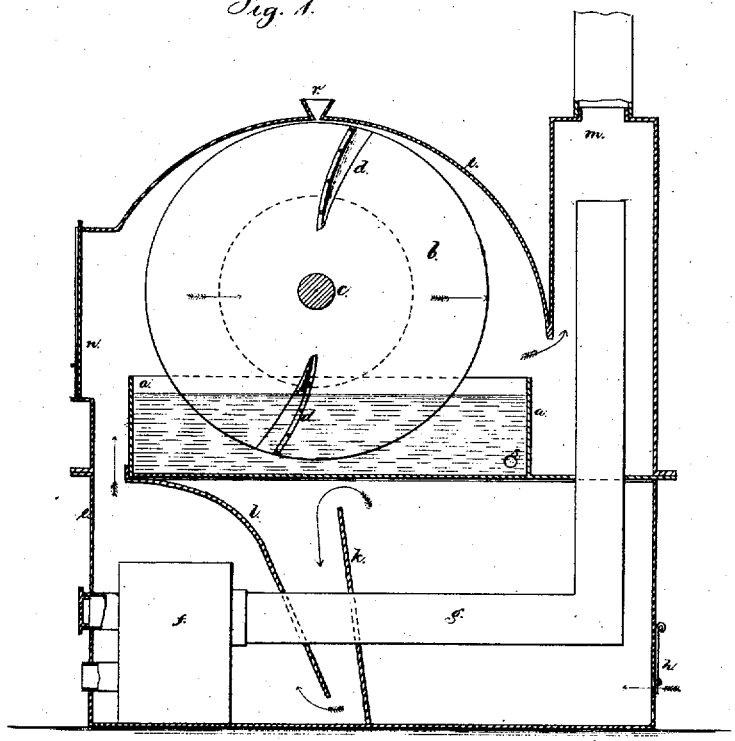
Figure 2:
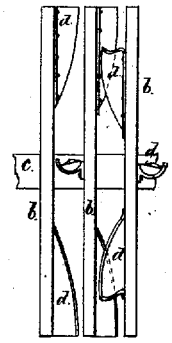

In the drawing, Figure 1 is a vertical section of our improved apparatus, and Fig. 2 is an elevation of the revolving disks.

*a* is the vessel to contain the extract to be concentrated, and *b b* are the disks attached to and revolving with the shaft *c* by competent power. In addition to the absorbent nature of the wooden disks, we make use of the buckets *d d*, of small pieces of sheet metal, to lift up and pour upon the surfaces of the disks small quantities of the liquid to be concentrated by evaporation. The casing *e*, containing the apparatus, is to be of suitable size and shape, and within and below the vessel *a*, a stove, heater, or furnace *f* is introduced with a smoke-flue *g*. Air is to be admitted to the case *a* by dampers or registers *h*, and circulates around the pipe *g*, up over the partition *k*, below the division *l*, around the stove or furnace, and up and between the revolving disks, and across over the vessel *a* to the escape-flue or opening *m*. We prefer to have the flue *g* terminate slightly below the flue *m*, so that said flue *m* conveys away both vapor and gases, and thereby the draught is increased, which causes a circulation of air through the apparatus; or the smoke-pipe may be led away in any other manner. An opening, with a cover, *n*, may be provided in the casing *e*, to observe the extract from time to time. There may be a funnel, *r*, provided at the top of the case, to allow for pouring in the liquid to be concentrated, and a cock at *s* for drawing off the liquid. Gauges and thermometer can also be provided as usual. The evaporation of the bark extract in a vacuum injures the material by the boiling operation employed, and the exposure of such extract to currents of air at ordinary temperature develops an acidity that is also detrimental. By our method the evaporation is very rapid, and the temperature of the heated air, being above 150° Fahrenheit, prevents any injurious action of the air on the extract.

What we claim as our invention, and desire to secure by Letters Patent, is—

1. The method herein specified of concentrating bark extracts by heated air within, a chamber acting upon the same while exposed upon revolving disks that are partially immersed in such extract, substantially as specified.

2. The buckets *d*, applied to and combined with the revolving disks *b*, substantially as and for the purposes set forth.

3. The arrangement of the heating-stove, casing *e*, passage-ways, vessel *a*, revolving disks *b*, and escape-flue or opening *m*, substantially as and for the purposes set forth.

Signed by us this 24th day of April, A. D. 1871.

THOS. W. JOHNSON, JR.
A. W. GOODELL.

Witnesses:
CHAS. H. SMITH,
GEO. T. PINCKNEY.

(29.)